US012707353B2

(12) United States Patent
Lyu et al.

(10) Patent No.: US 12,707,353 B2
(45) Date of Patent: Aug. 11, 2026

(54) CELL HANDOVER METHOD, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/360,932

(22) Filed: Oct. 16, 2025

(65) Prior Publication Data

US 2026/0046713 A1 Feb. 12, 2026

Related U.S. Application Data

(63) Continuation of application No. PCT/CN2023/123040, filed on Sep. 29, 2023.

(51) Int. Cl.
*H04W 36/00* (2009.01)
*H04W 74/0833* (2024.01)

(52) U.S. Cl.
CPC . *H04W 36/00837* (2018.08); *H04W 74/0833* (2013.01)

(58) Field of Classification Search
CPC ......... H04W 74/0833; H04W 56/0045; H04W 36/0072; H04W 36/00837
See application file for complete search history.

(56) References Cited

U.S. PATENT DOCUMENTS 11,375,546 B2 * 6/2022 Suzuki .................. H04W 76/27
2017/0142738 A1 * 5/2017 You ....................... H04L 5/0035
2022/0078670 A1 * 3/2022 Kung .................. H04W 36/085
2022/0369175 A1 * 11/2022 Li ...................... H04W 36/0033
2023/0370904 A1 * 11/2023 Zhang ............... H04W 36/0005
2024/0023045 A1 * 1/2024 Da Silva ............. H04W 36/249
2024/0114406 A1 * 4/2024 Zhou ................. H04W 36/0055
2024/0340946 A1 * 10/2024 Karimidehkordi .......................... H04W 36/00725
2024/0414772 A1 * 12/2024 Kim ...................... H04W 36/00
2025/0071647 A1 * 2/2025 Hong .................. H04W 36/249
2025/0088926 A1 * 3/2025 Hong .................... H04W 36/08
2025/0227570 A1 * 7/2025 Chandrashekar ............................ H04W 36/0077
2025/0227573 A1 * 7/2025 You ................ H04W 36/00835

FOREIGN PATENT DOCUMENTS

CN 119999294 A * 5/2025 ........ H04W 36/0058
WO WO 2023178697 A1 9/2023
WO WO-2024097295 A1 * 5/2024 ........... H04B 17/328

OTHER PUBLICATIONS

International Search Report in International Appln. No. PCT/CN2023/123040, mailed Jun. 21, 2024, 5 pages (with English translation).

* cited by examiner

*Primary Examiner* — Mong-Thuy T Tran

(74) *Attorney, Agent, or Firm* — Fish & Richardson P.C.

(57) ABSTRACT

The present disclosure provides a method for cell handover, a terminal device, and a network device. One example method includes: receiving, by a terminal device, a first time advance (TA) during layer 1 (L1)/layer 2 (L2) triggered mobility, wherein the first TA is a TA of the terminal device relative to a target cell, and the first TA is valid during an operational period of a first time alignment timer (TAT) of the terminal device.

20 Claims, 5 Drawing Sheets

CELL HANDOVER METHOD, TERMINAL DEVICE, AND NETWORK DEVICE

CROSS-REFERENCE TO RELATED APPLICATIONS

This application is a continuation of International Application No. PCT/CN2023/123040, filed on Sep. 29, 2023, the disclosure of which is hereby incorporated by reference in its entirety.

TECHNICAL FIELD

The present disclosure relates to the field of wireless communication technology, and in particular to a method for cell handover, a terminal device, and a network device.

BACKGROUND

In wireless communication systems, acquiring a time advance (TA) relative to a target cell in advance by a terminal device during cell handover is necessary. However, it is not yet clear how to determine the validity of the TA acquired by the terminal device in advance.

SUMMARY

Embodiments of the present disclosure provide a method for cell handover, a terminal device, and a network device. Aspects of the present disclosure will be illustrated below.

In a first aspect, a method for cell handover is provided, including: receiving, by a terminal device, a first TA during layer 1 (L1)/layer 2 (L2) triggered mobility, where the first TA refers to a TA of the terminal device relative to a target cell, and the first TA is valid during an operational period of a first time alignment timer (TAT) of the terminal device.

In a second aspect, a method for cell handover is provided, including: receiving, by a source cell, a first TA during L1/L2 triggered mobility, where the first TA refers to a TA of a terminal device relative to a target cell, and the first TA is valid during an operational period of a first TAT of the terminal device.

In a third aspect, a method for cell handover is provided, including: sending, by a target cell, a first TA during L1/L2 triggered mobility, where the first TA refers to a TA of a terminal device relative to the target cell, and the first TA is valid during an operational period of a first TAT of the terminal device.

In a fourth aspect, a terminal device is provided, including: a reception module configured to receive a first TA during L1/L2 triggered mobility, where the first TA refers to a TA of the terminal device relative to a target cell, and the first TA is valid during an operational period of a first TAT of the terminal device.

In a fifth aspect, a network device is provided, the network device corresponds to a source cell and includes: a transceiver module configured to receive a first TA during L1/L2 triggered mobility, where the first TA refers to a TA of a terminal device relative to a target cell, and the first TA is valid during an operational period of a first TAT of the terminal device.

In a sixth aspect, a network device is provided, the network device corresponds to a target cell and includes: a transceiver module configured to send a first TA during L1/L2 triggered mobility, where the first TA refers to a TA of a terminal device relative to the target cell, and the first TA is valid during an operational period of a first TAT of the terminal device.

In a seventh aspect, a terminal device is provided, including: a transceiver, a memory, and a processor, where the memory is configured to store a program, and the processor is configured to call the program in the memory to control the transceiver to receive or send signals, causing the terminal device to perform operations of the method according to the first aspect.

In an eighth aspect, a network device is provided, including: a transceiver, a memory, and a processor, where the memory is configured to store a program, and the processor is configured to call the program in the memory to control the transceiver to receive or send signals, causing the network device to perform operations of the method according to the second aspect.

In a ninth aspect, a network device is provided, including: a transceiver, a memory, and a processor, where the memory is configured to store a program, and the processor is configured to call the program in the memory to control the transceiver to receive or send signals, causing the network device to perform operations of the method according to the third aspect.

In a tenth aspect, a device is provided, including: a processor, where the processor is configured to call programs from a memory, causing the device to perform operations of the method according to any one of the first aspect, the second aspect, or the third aspect.

In an eleventh aspect, a chip is provided, including: a processor, where the processor is configured to call programs from a memory, causing a device provided with the chip to perform operations of the method according to any one of the first aspect, the second aspect, or the third aspect.

In a twelfth aspect, a non-transitory computer-readable storage medium is provided, the non-transitory computer-readable storage medium is configured to store programs, which cause a computer to perform operations of the method according to any one of the first aspect, the second aspect, or the third aspect.

In a thirteenth aspect, a computer program product is provided, including: programs that cause a computer to perform operations of the method according to any one of the first aspect, the second aspect, or the third aspect.

In a fourteenth aspect, a computer program is provided, the computer program is configured to causes a computer to perform operations of the method according to any one of the first aspect, the second aspect, or the third aspect.

In the present disclosure, the validation duration of the TA for the target cell is determined based on the TAT of the terminal device. In this way, the reliability of communication can be improved.

DETAILED DESCRIPTION OF THE EMBODIMENTS

The following will illustrate, in conjunction with the accompanying drawings, the technical solutions in the embodiments of the present disclosure in a clear and comprehensive way. It is apparent that the illustrated embodiments are only a part of the embodiments of the present disclosure, not all of them.

Communication System Architecture

Figure 1:
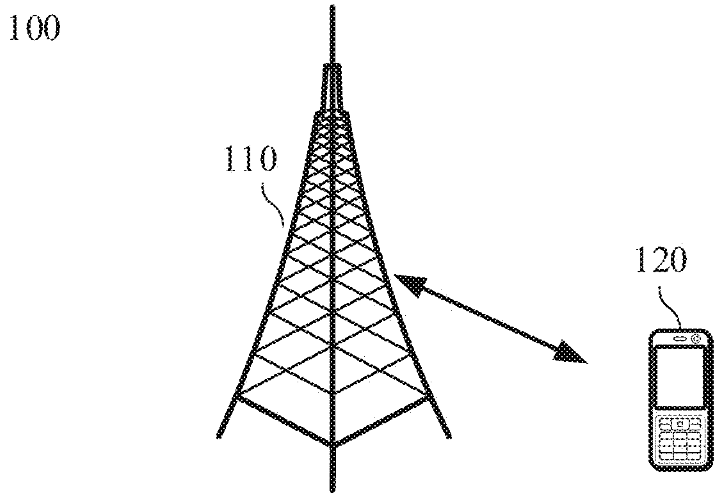
FIG. 1 is a schematic diagram of an architecture of a wireless communication system to which the embodiments of the present disclosure are applicable.

FIG. 1 is a schematic diagram of an architecture of a wireless communication system 100 to which the embodiments of the present disclosure are applicable. The wireless communication system 100 may include network devices 110 and terminal devices 120. The network devices 110 may be devices that communicate with the terminal devices 120. The network devices 110 can provide communication coverage for a specific geographic area and can communicate with the terminal devices 120 located in the coverage.

FIG. 1 exemplarily shows a network device and a terminal device. In some embodiments, the wireless communication system 100 may include one or more network devices 110 and/or one or more terminal devices 120. For a network device 110, one or more terminal devices 120 may be all located within the network coverage of the network device 110, all located outside the network coverage of the network device 110, or partially located within the network coverage of the network device 110 and partially located outside the network coverage of the network device 110, which will not be specified in the embodiments of the present disclosure.

In some embodiments, the wireless communication system 100 may further include other network entities such as a network controller, a mobility management entity, and the like, which will not be specified in the embodiments of the present disclosure.

It should be understood that the technical solutions of the embodiments of the present disclosure may be applied to various communication systems, such as 5th generation (5G) systems or new radio (NR), long term evolution (LTE) systems, LTE frequency division duplex (FDD) systems, LTE time division duplex (TDD), and the like. The technical solutions provided in the present disclosure may also be applied to future communication systems, such as the sixth generation mobile communication system, satellite communication system, and the like.

The terminal device in the embodiments of the present disclosure may be referred to as user equipment (UE), an access terminal, a user unit, a user station, a mobile station (MS), a mobile terminal (MT), a remote station, a remote terminal, a mobile device, a user terminal, a terminal, a wireless communication device, a user proxy or a user device. The terminal device in the embodiments of the present disclosure may refer to a device that provides voice and/or data connectivity to a user, and can be used to communicate people, an object and a computer, such as a handheld device or a vehicle-mounted device with wireless connection function. The terminal device in the embodiments of the present disclosure may be a mobile phone, a tablet computer (Pad), a notebook computer, a palm computer, a mobile internet device (MID), a wearable device, a virtual reality (VR) device, an augmented reality (AR) device, a wireless terminal in industrial control, a wireless terminal in self-driving, a wireless terminals in a remote medical surgery, a wireless terminals in smart grid, a wireless terminal in transportation safety, a wireless terminal in a smart city, a wireless terminal in a smart home, or the like. In some embodiments, the UE may function as a base station. For example, the UE may function as a scheduling entity that provides a sidelink signal between UEs in vehicle-to-everything (V2X) or device-to-device (D2D), etc. For example, a cellular phone and a car communicate with each other using sidelink signals. The cellular phone communicates with smart home devices, without relaying communication signals by a base station.

The network device in the embodiments of the present disclosure is a device configured to communicate with a terminal device, which may also be referred to as an access network device or a wireless access network device, for example, the network device may be a base station. The network device in the embodiments of the present disclosure may refer to a radio access network (RAN) node (or device) that provides access to a wireless network for a terminal device. The base station may broadly cover the following names, or be a substitute for the following names, such as Node B, evolved NodeB (eNB), next generation NodeB (gNB), a relay station, an access point, a transmitting and receiving point (TRP), a transmitting point (TP), a master eNodeB (MeNB), a secondary eNodeB (SeNB), a multi-standard radio (MSR) node, a home base station, a network controller, an access node, a wireless node, an access point (AP), a transmitting node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or a combination thereof. A base station may also be a communication module, a modem or a chip arranged in the aforementioned equipment or devices. The base station may also be a mobile switching center, a device that serves as a base station in D2D communication, V2X communication, machine-to-machine (M2M) communication, a network-side device in 6G network, and a device that serves as a base station in future communication systems. The base station can support networks using the same or different access technologies. The specific technology and equipment form adopted by the network device are not limited in the embodiments of the present disclosure.

The base station may be fixed or mobile. For example, a helicopter or a drone may be configured as a mobile base station, and one or more cells may move with the location of the mobile base station. In other examples, a helicopter or a drone may be configured as a device for communicating with another base station.

In some deployment, the network device in the embodiments of the present disclosure may refer to CU or DU, or the network device may include both CU and DU. gNB may also include AAU.

The network devices and the terminal devices may be deployed on land, including indoor or outdoor, handheld or vehicle boarded, or may be deployed on the water, or may further be deployed on airplanes, balloons and satellites in the air. The scenes where the network devices and the terminal devices are located is not limited in the embodiments of the present disclosure.

It should be understood that all or part of the functions of the communication devices in the present disclosure may also be implemented by the functions of software running on hardware, or by the virtualization functions instantiated on platforms (such as cloud platforms).

Separated Architecture for Control Unit (CU) and Data Unit (DU)

Figure 2:
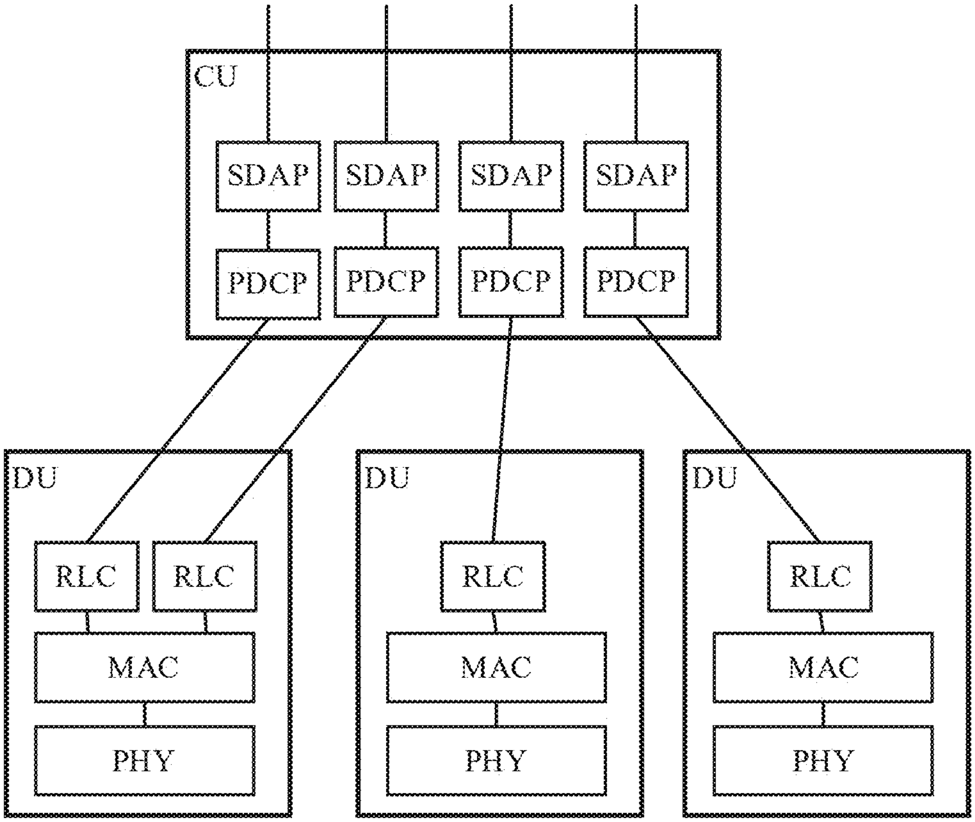
FIG. 2 is a schematic diagram of a system structure of a separated architecture for CU and DUs.

The 5G wireless communication network system achieves the separation of CUs and DUs, with one CU managing hundreds or thousands of DUs. From the perspective of the communication protocol stack, the control plane entity is at the CU, and the user plane entity is at the CU and DU. As shown in FIG. 2, for the user plane entity, CU includes the service data adaptation protocol (SDAP) layer and the packet data convergence protocol (PDCP) layer, and DU includes the radio link control (RLC) layer, the medium access control (MAC) layer, and the physical (PHY) layer.

Under the separated architecture for CU and DU, there are three ways for a terminal device to perform cell handover. The first way is performing handover without replacing DUs, that is, before and after handover of cells, neither DUs nor CUs are replaced. The second way is performing handover without replacing CUs, that is, before and after handover of cells, DUs are replaced, but CUs are not replaced. The third way is performing handover and replacing CUs, that is, before and after handover of cells, DUs and CUs are all replaced.

L1/L2 Triggered Mobility

Figure 3:
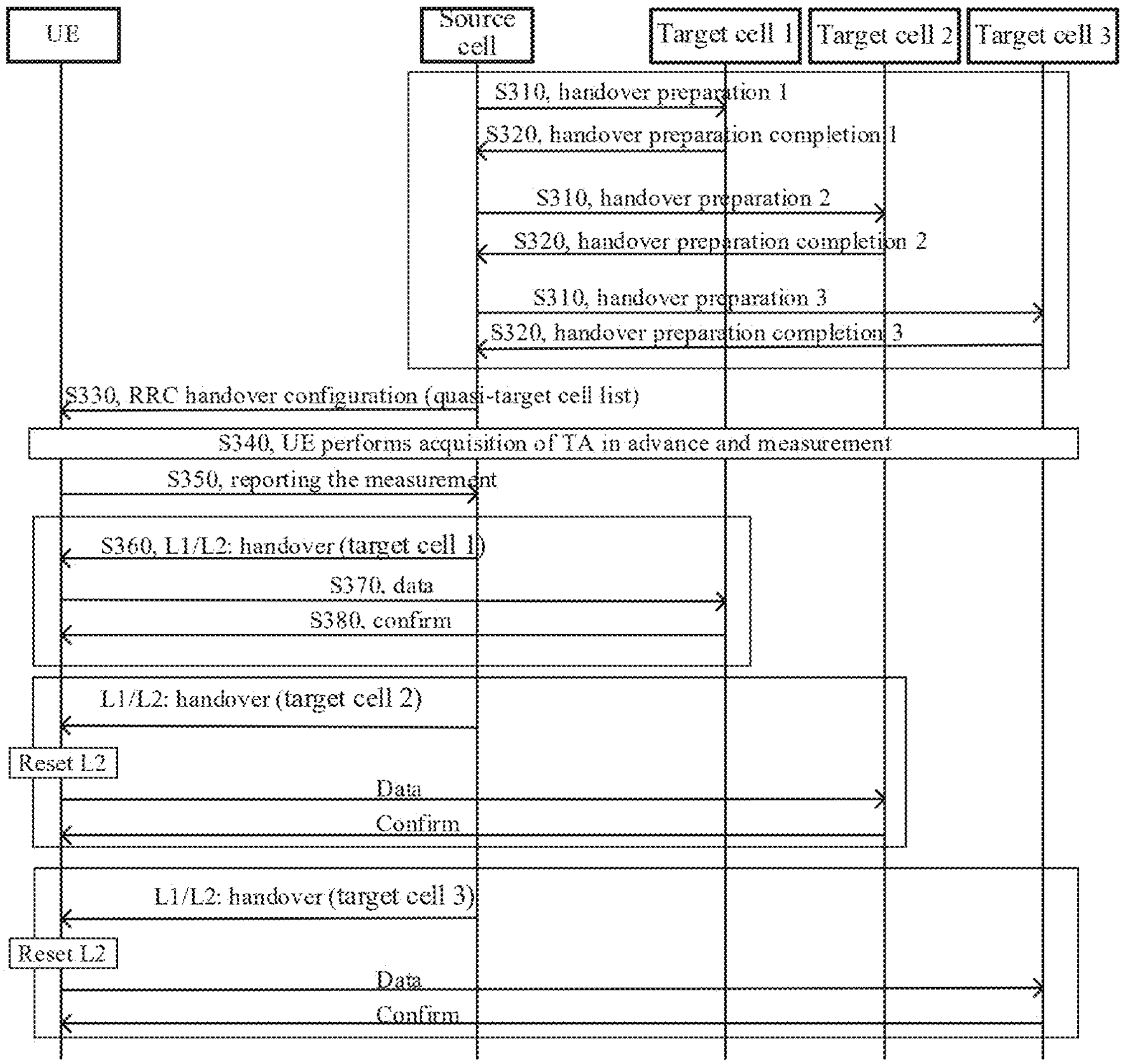
FIG. 3 is a schematic flowchart of a method for lower-layer fast handover.

In order to reduce the delay of performing cell handover by a terminal device, related technologies have introduced an L1/L2 triggered mobility method, also known as a lower-layer fast handover method. The lower-layer fast handover method includes acquiring in advance (also known as pre-acquiring) the TA of the target cell by the terminal device. This method may have a process as shown in FIG. 3, including operations S310 to S380. The target cells that can be selected by the terminal device include target cell 1, target cell 2, and target cell 3. The handover from a source cell to target cell 1 belongs to the handover without replacing DU, the handover from the source cell to target cell 2 belongs to the handover with replacing DU, and the handover from the source cell to target cell 3 belongs to the handover with replacing CU.

At S310, the source cell sends handover preparation messages to the target cells, respectively.

At S320, the source cell receives the handover preparation completion messages sent by the target cells.

At S330, the cells send a quasi-target cell list to the terminal device using a handover configuration message at the radio resource control (RRC) layer, where the quasi-target cell list includes configuration information for all candidate cells (including whether to perform L2 reset on each target cell).

At S340, the terminal device initiates a random access preamble to each cell based on configuration information to perform random access and acquire TA in advance, and measures each cell. TA may be notified to the terminal device by the target cell, or the target cell may not notify the TA to the terminal device but notify the TA to the source cell, and the source cell stores the TA.

At S350, the terminal device reports the measurement results of the candidate target cells to the source cell, and the source cell determines the target cell for handover.

At S360, after determining the target cell, the source cell notifies the terminal device using L1/L2 signaling. For example, the target cell determined by the source cell may be target cell 1, target cell 2, or target cell 3.

At S370, the terminal device sends uplink data to the target cell. At this point, when the terminal device has acquired the TA of the target cell in advance and a target base station has allocated configured grant (CG) resources to the terminal device, the terminal device directly sends uplink data. Otherwise, the terminal device acquires uplink resources and TA using a random access procedure, and then sends uplink data.

At S380, the terminal device receives a confirm message from the target cell, and the handover process ends.

According to the above description, in the L1/L2 triggered mobility process, in order to reduce the handover delay, the terminal device will acquire the TA of the target cell in advance. However, there is currently no clear regulation on how long the TA is valid (or how the terminal device, source cell, or target cell determines whether the TA acquired in advance is valid).

In order to address above problems, a detailed illustration of the technical solutions provided in the embodiments of the present disclosure is provided below.

Figure 4:
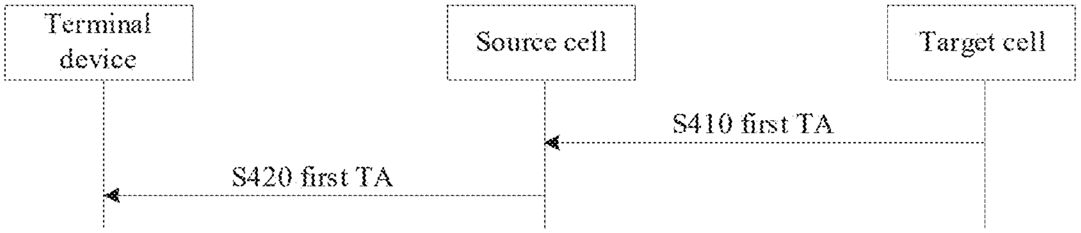
FIG. 4 is a schematic flowchart of a method for cell handover provided in some embodiments of the present disclosure.

FIG. 4 is a schematic flowchart of a method for cell handover provided in some embodiments of the present disclosure. Operations of the method in FIG. 4 may be performed by a terminal device as mentioned in any one of the above embodiments, such as the terminal device 120 in FIG. 1.

Referring to FIG. 4, as shown in operations S410 to S420, during L1/L2 triggered mobility, the target cell sends the first TA to the source cell. After receiving the first TA, the source cell may send the first TA to the terminal device.

The first TA is a TA of the terminal device relative to the target cell. In other words, the first TA corresponds to the terminal device and the target cell.

It should be understood that during L1/L2 triggered mobility, the operations S410 to S420 may be performed at the stage of acquiring TA in advance.

In some embodiments, the target cell may also directly send the first TA to the terminal device (not shown in the drawings).

Before operation S410, the terminal device may send a random access message (configured to carry preamble) to the target cell first, in order to acquire the first TA.

For example, the terminal device may first send a random access message to the target cell. After receiving the random access message sent by the terminal device, the target cell may first transmit the first TA to the source cell, and then the source cell may transmit the first TA to the terminal device. For example, the source cell may send L1/L2 triggered mobility indication information to the terminal device, and the first TA may be carried in the L1/L2 triggered mobility indication information.

For example, the target cell may allocate a cell-radio network temporary identifier (C-RNTI) to the terminal device in advance, and then send the first TA to the terminal device based on the C-RNTI. For example, the terminal device may first receive the C-RNTI allocated by the target cell (which may be acquired using the handover configuration message sent by the source cell or the physical downlink control channel (PDCCH) command (order) sent by the source cell). Then, the terminal device may send a random access message to the target cell. At last, the terminal device may monitor the PDCCH of the target cell based on the C-RNTI to receive the first TA.

In some embodiments, the first TA is valid during an operational period of a first TAT of the terminal device. The first TAT may be a TAT configured by the source cell for the terminal device or a TAT specified in protocols. The timing length (or value) of the first TAT may be determined by the movement speed of the terminal device. For example, the faster the terminal device moves, the longer the timing length of the first TAT, indicating that the value of the first TA needs to be updated frequently. For example, the slower the terminal device moves, the longer the timing length of the first TAT, indicating that the frequency of updating the value of the first TA may be relatively low. When the movement speed of the terminal device does not change significantly in a short time period, the timing length of the first TAT may remain unchanged. In the embodiments of the present disclosure, the validation duration of the TA of the target cell is determined based on the TAT of the terminal device, thereby improving the reliability of communication.

The source cell may send the first TAT to the target cell, allowing the target cell to determine the validation duration of the first TA based on the first TAT. The embodiments of the present disclosure do not specifically limit the timing of sending the first TAT.

In some embodiments, the source cell may send the first TAT to the target cell in a handover preparation message.

In some embodiments, the source cell may send the first TAT to the target cell after sending the handover preparation message to the target cell. For example, the source cell may wait until the target cell notifies the source cell of the first TA, and then send the first TAT to the target cell. At this point, the target cell does not yet know for which terminal device the first TAT is configured, and can only simply record the mapping relationship between the first TAT and its allocated uplink resources.

In the embodiments of the present disclosure, the timing of activating the first TAT by the source cell, the target cell, and the terminal device is not specifically limited.

In some embodiments, the source cell may activate the first TAT upon receiving the first TA sent by the target cell. For example, the source cell may send the first TAT to the target cell using a handover preparation message. At this point, the source cell and the target cell may determine the activating time of the first TAT based on the transmission time of the first TA. For example, after the target cell sends the first TA to the source cell, the first TAT may be activated; or after the source cell receives the first TA, the first TAT may be activated.

In some embodiments, the source cell may activate the first TAT after receiving the first TA from the target cell and returning the first TAT to the target cell. For example, the source cell does not send the first TAT to the target cell using a handover preparation message, but waits until the first TA is received, then the source cell sends the first TAT to the target cell. At this point, the source cell and the target cell may determine the activating time of the first TAT based on the transmission time of the first TAT. For example, after the source cell sends the first TAT to the target cell, the first TAT may be activated; or after the target cell receives the first TAT, the first TAT may be activated.

In some embodiments, the terminal device may activate the first TAT upon receiving the first TA sent by the target cell. For example, as mentioned above, the target cell directly sends the first TA to the terminal device. After receiving the first TA, the terminal device may activate the first TAT; or after the target cell sends the first TA, the first TAT may be activated.

When the terminal device sends random access messages to a plurality of target cells, the source cell and/or the terminal device may activate a plurality of first TATs after receiving first TAs from a plurality of target cells, the plurality of first TATs respectively correspond to the plurality of first TAs, and the values of the plurality of first TATs may be the same.

After the first TAT is activated, its operational period may be determined based on the timing length of the first TAT. For example, the operational period of the first TAT may be the timing length of the first TAT. After the first TAT is activated, the first TA is valid for the timing length of the first TAT.

For the terminal device, the operational period of the first TAT may also be determined based on a remaining period of the first TAT indicated by the source cell, and the operational period of the first TAT may be the remaining period of the first TAT indicated by the source cell. The remaining period of the first TAT may be the remaining period of the first TAT activated at the source cell.

For example, when the first TA is transmitted to the terminal device via the source cell, the source cell may notify the terminal device of the first TA and the remaining period of the first TAT in the L1/L2 triggered mobility indication. After receiving the remaining period of the first TAT indicated by the source cell, the terminal device may activate a timer based on the remaining period of the first TAT, and the first TA is valid during the operational period of this timer. For example, the value of the first TAT is 1000, and the source cell activates the first TAT after receiving the TA value sent by the target cell. When triggering the lower-layer fast handover, TAT has already operated for 300 ms, then the source cell instructs 700 ms to the terminal device, indicating that "within 700 ms, the pre-acquired TA is valid". After receiving the instruction, the terminal device may activate a timer with a timing length of 1000 ms and an initial value of 300 ms, or the timer may have a timing length of 700 ms and an initial value of 0, so that the pre-acquired TA is valid during the operational period of the timer.

In some embodiments, when the terminal device resends a random access message to the target cell before timeout of the first TAT, the first TAT is reactivated. For example, the target cell resends the first TA in response to a random access message resent by the terminal device, then the first TAT is reactivated. After receiving the first TA again, the terminal device or the source cell reactivates the first TAT. Alternatively, when the terminal device receives the remaining period of the first TAT again, the timer that is activated by the terminal device is reactivated.

In some embodiments, the method in FIG. 4 may further include: sending, by the target cell, the first configuration information to the source cell (such as using a handover preparation completion message). Correspondingly, the source cell may send some or all of the information in the first configuration information to the terminal device (such as using a handover configuration message). In some embodiments, the first configuration information may be configured to indicate one or more of: a C-RNTI allocated to the terminal device by the target cell, a CG resource allocated to the terminal device by the target cell, a PDCCH surveillance space allocated to the terminal device by the target cell, a dedicated physical random access channel (PRACH) resource allocated to the terminal device by the target cell, and scheduling request (SR) configuration.

In some embodiments, the target cell may send the first configuration information to the source cell using a handover preparation completion message. For example, after receiving the handover preparation message from the source cell, the target cell may perform admission control on the terminal device and carry the C-RNTI allocated to the terminal device by the target cell, the CG resources allocated to terminal devices by the target cell, the PDCCH surveillance space allocated to the terminal device by the target cell, and the SR configuration in the handover preparation completion message. For example, after receiving the handover preparation message from the source cell, the target cell may only perform admission control on the terminal device, and does not carry the C-RNTI allocated to the terminal device by the target cell, the CG resources allocated to terminal devices by the target cell, the PDCCH surveillance space allocated to the terminal device by the target cell, and the SR configuration in the handover preparation completion message. The above information may be notified to the source cell by the target cell after the terminal device successfully acquires TA in advance. For example, after the target cell sends the first TA to the terminal device, the target cell may additionally send a notification message to the source cell. This notification message may be referred to as an indication message for terminal device information, and the above-mentioned information may be transmitted using the indication message for terminal device information. Of course, some of the above-mentioned information may also be transmitted in the handover preparation completion message, and others may be transmitted in the indication message for terminal device information. The embodiments of the present disclosure do not specifically limit this.

In some embodiments, when the first configuration information includes dedicated PRACH resources allocated by the target cell for the terminal device, the dedicated PRACH resources may be carried in the handover preparation completion message.

In some embodiments, the source cell may send, for example after receiving the handover preparation message sent by the target cell, the first configuration information to the terminal device using a handover configuration message.

It should be understood that the handover configuration message may carry all the information in the first configuration information, or only some of the information in the first configuration information. In some embodiments, the information content carried by the handover configuration message may be associated with the information content provided by the target cell to the source cell using the handover preparation completion message. For example, when the target cell carries the C-RNTI allocated to the terminal device by the target cell in the handover preparation completion message, the source cell may notify the terminal device of this C-RNTI in the handover configuration message. For example, when the target cell carries information about the CG resources allocated to the terminal device by the target cell in the handover preparation completion message, the source cell may indicate the CG resources to the terminal device in the handover configuration message. For example, when the target cell carries information about the PDCCH surveillance space allocated to the terminal device by the target cell in the handover preparation completion message, the source cell may indicate the PDCCH surveillance space (or control resource set, CORESET) to the terminal device in the handover configuration message. For example, when the target cell carries the SR configuration allocated to the terminal device by the target cell in the handover preparation completion message, the source cell may indicate the SR configuration to the terminal device in the handover configuration message. For example, when the target cell carries information about the dedicated PRACH resources allocated to the terminal device by the target cell in the handover preparation completion message, the source cell may indicate the dedicated PRACH resources to the terminal device in the handover configuration message. It is noted that even if the target cell carries the above information of the terminal device in the handover preparation completion message, the source cell may provide all of the above information to the terminal device, or only provide a portion of the above information to the terminal device. When the source cell only provides a portion of the above information to the terminal device in the handover configuration message, other information may be provided to the terminal device when the source cell sends an L1/L2 triggered mobility instruction to the terminal device.

In some embodiments, when the first configuration information only indicates the CG resource, after handover of the terminal device to the target cell, the first uplink data (or the first transmission block (TB)) at the target cell may be transmitted using the CG resource.

In some embodiments, when the first configuration information only indicates the PDCCH surveillance space, the first uplink data of the terminal device at the target cell may be transmitted using dynamic grant (DG) which is determined based on the PDCCH surveillance space. For example, after handover of the terminal device to the target cell, the terminal device may monitor the PDCCH at the target cell to acquire the DG, and then send the first uplink data to the target cell using the uplink resources allocated by the DG.

In some embodiments, when the first configuration information indicates the CG resource and the PDCCH surveillance space (used to determine DG), the terminal device may select the CG resource or the DG to transmit the first uplink data.

In some embodiments, when the first configuration information indicates the CG resource and the PDCCH surveillance space (used to determine DG), the terminal device may transmit the first uplink data using an uplink resource of the CG resource and the DG that has an earlier transmission occasion. That is to say, when the transmission occasion for the CG resource arrives first, the first uplink data is transmitted using the CG resource, and when the transmission occasion for the DG arrives first, the first uplink data is transmitted using the DG.

In some embodiments, when the target cell allocates a SR to the terminal device, the terminal device may request uplink resources from the target cell using the SR, and then the terminal device may monitor the PDCCH of the target cell to acquire the uplink resources allocated by the target cell. Then, the first uplink data may be transmitted using the uplink resource.

The first TA mentioned above may be determined using a random access procedure (which may be initiated at the stage of acquiring TA in advance) initiated by the terminal device. There may be various ways to implement the random access procedure, and the following is a brief example of the implementation of random access procedure by the terminal device.

Random Access Procedure Initiated by Terminal Device

Figure 5:
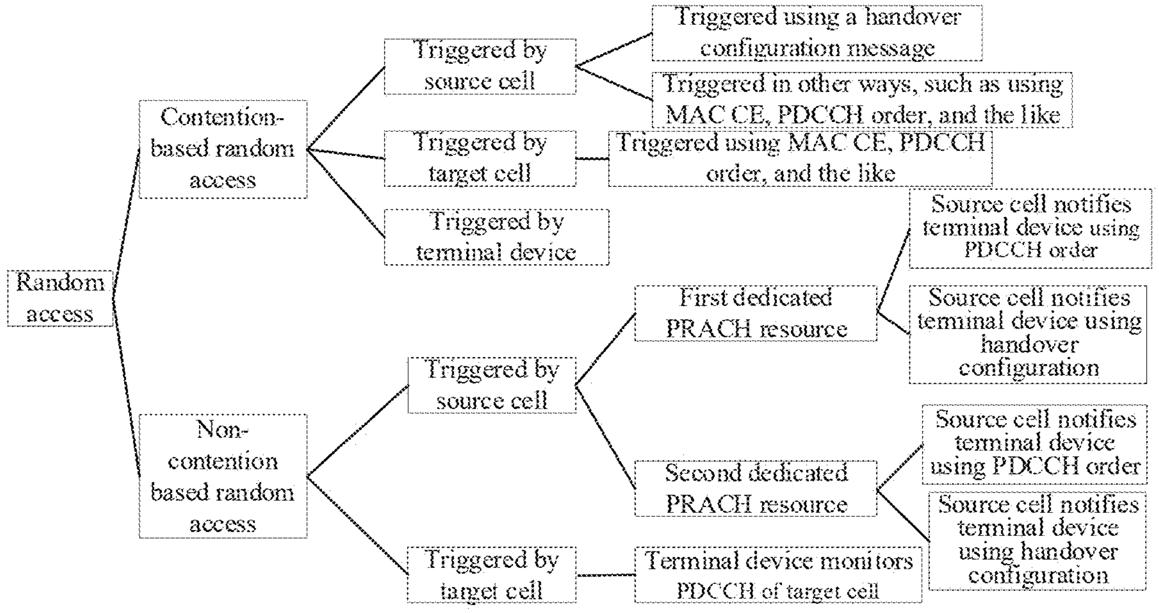
FIG. 5 is a diagram showing classification of the random access procedures provided in some embodiments of the present disclosure.

In order to acquire the first TA, the random access procedure initiated by the terminal device may be either a contention-based random access procedure or a non-contention based random access procedure. The detailed classification of the random access procedures initiated by the terminal device may be as shown in FIG. 5.

The contention-based random access procedure may be triggered by the source cell, the target cell, or by the terminal device. The contention-based random access procedure triggered by the target cell may include: contention-based random access procedure triggered by the target cell based on a MAC control element (CE), or contention-based random access procedure triggered by the target cell based on a PDCCH command. The contention-based random access procedure triggered by the source cell may include: contention-based random access procedure triggered by the source cell based on the handover configuration message, contention-based random access procedure triggered by the source cell based on the MAC CE, or contention-based random access procedure triggered by the source cell based on the PDCCH commands.

When the contention-based random access procedure is triggered by the target cell, the terminal device needs to monitor the notifications from the target cell, which may affect the data transmission of the terminal device at the source cell. When the contention-based random access procedure is triggered by the source cell or triggering of the contention-based random access procedure is selected by the terminal device, it would not affect the data transmission of the terminal device at the source cell. It is noted that another triggering mode exists: the target cell wishes the terminal device to initiate random access, the target cell notifies the source cell, and then the source cell notifies the terminal device to "initiate contention-based random access procedure". This situation is also classified as random access triggered by the source cell and would not affect the data transmission of the terminal device at the source cell.

The non-contention based random access procedure may be triggered by the source cell or the target cell. When triggered by the target cell, the source cell must notify the terminal device of "the C-RNTI allocated to the terminal device by the target cell", and the terminal device also needs to monitor the PDCCH of the target cell, which will bring adverse effect to the data transmission of the terminal device at the source cell.

In some embodiments, when the non-contention based random access procedure is triggered by the source cell, the non-contention based random access procedure may be initiated based on the first dedicated PRACH resource. The first dedicated PRACH resource is selected, by the source cell, from a first PRACH resource group provided by the target cell, the first PRACH resource group may be a set of resources dedicated to random access and allocated by the target cell to the source cell. The first PRACH resource group may be allocated when establishing connections between base stations, or be reallocated after establishing connections between base stations. The source cell may allocate, specifically for the terminal device, a portion of resources from the first PRACH resource group for random access to the target cell, and ensure that this portion of resources will not be allocated to other terminal devices. In this way, contention among a plurality of terminal devices can be prevented.

For example, the target cell may allocate a random access resource pool to the source cell. When handover of a terminal device in the source cell to the target cell is needed, one of these random access resources may be used to initiate a random access procedure to the target cell. Furthermore, as long as the source cell ensures not to allocate a same resource in the resource pool to a plurality of terminal devices, contention can be prevented.

Moreover, the source cell may indicate a first dedicated PRACH resource to the terminal device using a PDCCH command. After receiving the PDCCH command, the terminal device initiates random access to the target cell based on the first dedicated PRACH resource. The PDCCH command needs to indicate "cell identifier of the target cell" to the terminal device. Since the PDCCH command is scrambled using the C-RNTI allocated by the source cell, there is no need for the target cell to allocate C-RNTI to the terminal device.

In some embodiments, when the non-contention based random access procedure is triggered by the source cell, the non-contention based random access procedure may be initiated based on a second dedicated PRACH resource allocated to the terminal device by the target cell. For example, when the target cell allocates dedicated PRACH resources to the terminal device in the first configuration information, and notifies the terminal device of the information of the dedicated PRACH resources via the source cell, the terminal device may directly initiate a random access procedure to the target cell using the dedicated PRACH resources.

The above-mentioned random access procedure triggered by the source cell may be triggered based on a first message. The source cell may send the first message to the terminal device, triggering the terminal device to initiate a random access procedure. The first message may be a PDCCH command, a handover configuration message, MAC CE, or the like.

In some embodiments, when the target cell does not provide the first PRACH resource group to the source cell, and the target cell does not allocate the second dedicated PRACH resources to the terminal device, the source cell may notify the terminal device to monitor PDCCH of the target cell using the first message to trigger random access. After monitoring the PDCCH command from the target cell, the terminal device may initiate non-contention based random access to the target cell based on the PDCCH command from the target cell. In order to achieve this random access, the terminal device should know the C-RNTI allocated to the terminal device by the target cell.

When the source cell triggers random access, a same terminal device may be triggered to initiate random access to a plurality of quasi-target cells concurrently to acquire the first TA in advance. Generally, the source cell may only trigger the next random access after the previous triggered random access has ended. When the terminal device does not need to monitor a random access response (RAR) after sending the preamble, and the target cell sends the measured TA value to the source cell, the source cell does not need to wait until the random access ends before triggering the next random access. The source cell may trigger the next random access immediately after the terminal device sends the preamble, or the source cell may trigger the next random access before the terminal device sends the preamble. The source cell may also trigger the terminal device to send the preamble to a plurality of quasi-target cells in a same PDCCH order.

After receiving the preamble from the terminal device, the target cell may decide to notify the first TA to the terminal device and/or the target cell based on whether the target cell knows the purpose of the random access initiated by the terminal device.

In some embodiments, when the target cell knows that the purpose of the terminal device initiating random access is to acquire the first TA in advance, the target cell may notify the source cell of value of the first TA, or notify the terminal device of value of the first TA. For example, when the random access procedure is initiated based on the second dedicated PRACH resource, and the target cell receives the preamble of the terminal device from the second dedicated PRACH resource, the target cell considers that the purpose of the terminal device initiating the random access is to acquire the first TA in advance. In this case, the target cell may notify the source cell of the value of the first TA, or notify the terminal device of the value of the first TA.

In some other embodiments, when the target cell does not know the purpose of the terminal device initiating random access, the target cell may only notify the first TA to the terminal device and do not notify the source cell of the value of the first TA.

Therefore, for the contention based random access, the target cell may only send the first TA to the terminal device and cannot send the first TA to the source cell; and for the non-contention based random access, the target cell may send the first TA to the terminal device and/or the source cell.

After sending the first TA to the terminal device and/or the source cell, when the target cell is aware of the identity of the terminal device, the target cell may activate the TAT corresponding to terminal device. For example, when the random access procedure is initiated based on the second dedicated PRACH resource, i.e. the PRACH resource allocated by the target cell to the terminal device, the target cell is aware of the identity of the terminal device, and the target cell may activate the TAT corresponding to the terminal device after sending the first TA. When the target cell is not aware of the identity of the terminal device, the source cell needs to notify the target cell of the TAT used by the terminal device corresponding to the first TA. For example, when the random access procedure is initiated based on the first dedicated PRACH resource, i.e. the PRACH resource selected by the source cell from the first PRACH resource group provided by the target cell, the target cell is not aware of the identity of the terminal device. The source cell may send the first TAT to the target cell after the target cell notifies the source cell of the first TA, as illustrated above, and the target cell may activate the first TAT. The source cell may also send the first TAT to the target cell in the handover preparation message, and after the target cell notifies the source cell of the first TA, the source cell determines the identity of the terminal device and notifies the target cell of the identity document (ID) of the terminal device. The target cell determines a value of the first TAT of the terminal device based on the ID of the terminal device and initiates the first TAT. In addition, when protocols specify a value of a default TAT, the target cell may also activate the default TAT after sending the first TA, without need of being aware of the identity of the terminal device.

It is noted that the above-mentioned content related to the "random access procedure of the terminal device" may be implemented independently (i.e. it may be an independent embodiment, regardless of whether the first TAT is introduced), or the content related to the "random access procedure of the terminal device" may be combined with the content provided by other embodiments. A more specific embodiment related to the random access procedure of the terminal device is provided below. It should be understood that the following embodiment may be an independent embodiment or be combined with the above-mentioned embodiments.

The source cell indicates the first PRACH resource to the terminal device. The first PRACH resource may be a PRACH resource dedicated for the terminal device, therefore, the first PRACH resource may also be referred to as a first dedicated PRACH resource. The first PRACH resource may be selected by the source cell from the first PRACH resource group (or first PRACH pool) provided by the target cell, and the first PRACH resource group may be the resource group allocated by the target cell for random access to the source cell. It should be understood that the target cell is not aware that the first PRACH resource is a dedicated PRACH resource for the terminal device, and the "dedicated" nature of the first PRACH resource may be guaranteed by the source cell. For example, the source cell may allocate only the first PRACH resource in the first PRACH resource group to a specific terminal device, and not to other terminal devices.

In some embodiments, the first PRACH resource may be indicated by the first message, such as a PDCCH command or MAC CE. The first message may be configured to trigger the terminal device to initiate a random access procedure.

After receiving the first message, the terminal device may initiate a random access procedure (such as a non-contention based random access procedure) and use the first PRACH resource to send a preamble to the target cell.

In some embodiments, after receiving the preamble, the target cell may establish a mapping relationship between the preamble and the CG resources allocated by the target cell.

In related technologies, after the target cell allocates uplink resources to the terminal device, the validation duration of the uplink resources is not clear, which may lead to unreliable communication (for example, when the terminal device transmits uplink data on invalid uplink resources, the network device cannot receive the uplink data). In order to address this problem, in some embodiments, the uplink resources (such as CG resources mentioned above) allocated by the target cell to the terminal device may be set to be valid during the operational period of the first TAT. By specifying the validation duration of the uplink resources allocated to the terminal device by the target cell, communication reliability can be improved. For example, when the target cell has allocated uplink resources (such as CG resources) to the terminal device, before timeout of the first TAT, the terminal device considers that the uplink resources allocated by the target cell are valid. Assuming that there are available CG resources before timeout of the first TAT, the terminal device may use the CG resources to transmit the first uplink data. When there are no available CG resources before timeout of the first TAT, once timeout of the first TAT occurs, the CG allocated by the target cell will no longer be valid.

In some embodiments, when the target cell has allocated a PDCCH surveillance space to the terminal device, the PDCCH surveillance space may also be set as being valid during the operational period of the first TAT. By specifying the validation duration of the PDCCH surveillance space allocated to the terminal device by the target cell, the reliability of communication can be improved. For example, when the target cell has allocated a PDCCH surveillance space to the terminal device, the terminal device needs to monitor the PDCCH of the target cell before timeout of the first TAT to acquire the DG. When the terminal device does not acquire the DG before timeout of the first TAT, the PDCCH surveillance space allocated by the target cell is no longer valid.

In some embodiments, when the target cell has configured both the CG resource and the PDCCH surveillance space for the terminal device, the terminal device may transmit the first uplink data using one of the CG resource and the DG (determined based on the PDCCH surveillance space) that has an earlier transmission occasion before timeout of the first TAT. When the terminal device fails to complete the transmission of the first uplink data before timeout of the first TAT, the CG resource and the PDCCH surveillance space will no longer be valid.

In some embodiments, when the CG resource and the PDCCH surveillance space configured for the terminal device by the target cell are no longer valid, the terminal device may perform a handover failure related procedure. For example, when timeout of the first TAT occurs and the terminal device has not successfully accessed the target cell, the terminal device may initiate a contention-based random access to the target cell that performs the lower-layer fast handover. When the terminal device has acquired TAs of a portion of the quasi-target cells in advance and maintains the TATs corresponding to the TAs of these quasi-target cells, and there are TATs of which timeout has not yet occurred among these TATs, the terminal device may attempt to access these quasi-target cells. For example, the terminal device may directly send the first uplink data block to the quasi-target cells using CG or DG, or initiate a contention-based random access.

In some embodiments, when the CG resource or the PDCCH surveillance space allocated to the terminal device by the target cell are no longer valid, the target cell does not delete the CG resource or the PDCCH surveillance space configured for the terminal device. When the TAT corresponding to the terminal device is reactivated, the CG resource or the PDCCH surveillance space allocated to the terminal device by the target cell become valid again.

In related technologies, it is not yet clear how to determine and who determines whether the random access is successful when the source cell triggers the terminal device to initiate random access to the target cell to acquire TA in advance. In order to address this problem, after sending the first message (configured to trigger the terminal device to initiate a random access procedure) to the terminal device, the source cell may activate the first timer. When the first TA is received during the operational period of the first timer, the source cell determines that the random access procedure is successful. When the first TA is not received during the operational period of the first timer, the source cell determines that the random access procedure has failed. When the source cell determines that the random access procedure has failed, the source cell may trigger the terminal device to initiate random access to the target cell again. The value of the first timer is determined by the implementation algorithm of the source base station, and the specific value is related to the duration of message interaction between cells, as well as the PRACH resource density of the target cell. Based on the first timer, the source cell can effectively determine whether the triggered random access procedure is successful, which helps improve the efficiency of cell handover of the terminal device.

Furthermore, the first message may include one or more of: the offset value of the transmission power of the random access message; and information for indicating whether the terminal device needs to maintain the number of random access attempts. For example, the first information may include the offset value of the transmission power of the random access message. The terminal device may calculate the initial power for sending the preamble based on the path loss between the terminal device and the target cell, and then add the power offset value notified in the first message as the power for sending the preamble. When a random access is unsuccessful and the source cell triggers another random access, the power offset value will be increased. When the terminal device does not maintain a "random access counter", calculation of the power for sending preambles is equivalent to adding power offset values different from each other to an open-loop calculation benchmark. For example, the first information may also include information for indicating whether the terminal device needs to maintain the number of random access attempts. If yes, the terminal device is responsible for maintaining the number of random access attempts. If no, the network side is responsible for maintaining the number of random access attempts. Furthermore, whether the terminal device needs to maintain the number of random access attempts may be explicitly indicated, for example, using 1 to indicate that the terminal device needs to maintain the number of random access attempts, and using 0 to indicate that the terminal device does not need to maintain the number of random access attempts. Whether the terminal device needs to maintain the number of random access attempts may also be implicitly indicated. When the source cell indicates the terminal device to send a preamble at other cells, the terminal device determines that the terminal device does not need to maintain the number of random access attempts. When the source cell indicates the terminal device to send a preamble at the present cell, the terminal device determines that the terminal device needs to maintain the number of random access attempts.

Furthermore, the source cell may count the total number of random access attempts made by the terminal device on each target cell, that is, the number of attempts made before successful random access. The source cell may notify the count of the number of random access attempts made by the terminal device to the target cell, in order for the target cell to adjust its configuration parameters related to random access.

After the random access initiated by the terminal device to the target cell is successful, the source cell may send a lower-layer fast handover instruction to the terminal device, instructing the terminal device to perform handover to the target cell. The source cell may determine whether to trigger the lower-layer fast handover based on the measurement results of the terminal device. When it is determined to perform handover, an instruction is sent to the terminal device. Furthermore, the indication may be MAC CE or downlink control information (DCI).

Figure 6:
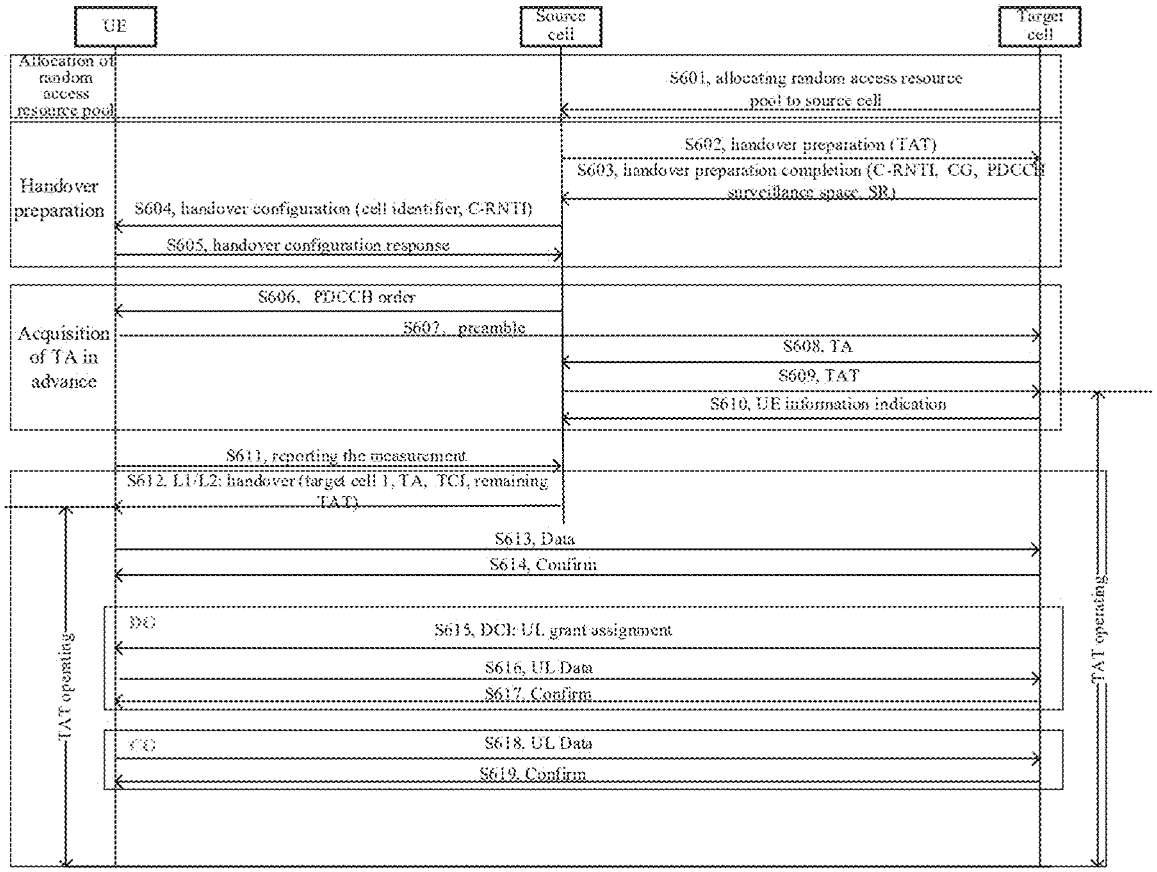
FIG. 6 is a schematic flowchart of a method for cell handover provided in some embodiments of the present disclosure.

In the following, the method for cell handover according to some embodiments of the present disclosure will be exemplarily illustrated with reference to FIG. 6. As shown in FIG. 6, the process of the terminal device performing cell handover may be divided into five stages: allocating random resource pool, handover preparation, pre-acquiring TA, indicating to perform handover, and TAT operating.

Stage of Allocating Random Resource Pool

At S601, the target cell allocates a random access resource pool to the source cell. When a UE at the source cell needs to perform handover to the target cell, the UE may use one of the resources in the random access resource pool to initiate a random access procedure to the target cell. The random access resource pool is public and is used by all UEs that may perform handover from the source cell to the target cell. Therefore, the random access resource pool may be allocated when establishing connections between base stations, or be allocated after establishing connections between base stations.

Stage of Handover Preparation

At S602, the source cell notifies the target cell of the TAT value of UE in the handover preparation message. When the UE initiates random access to the target cell and acquires TA, the target cell may use the TAT to determine the validation duration of TA. The source cell may also notify the target cell of the TAT value of UE at other operations after the handover preparation message, such as operation S609 shown in FIG. 6. After the target cell notifies the TA to the source cell, the source cell notifies the target cell of the TAT value of UE.

After receiving the handover preparation message, the target cell performs admission control on the UE, and notifies the source cell of information such as the C-RNTI, CG resource, PDCCH surveillance space (i.e., CORESET), SR, or the like allocated to the UE by the target cell in the handover preparation completion message used in operation S603. The target cell may also only perform admission control and not notify the source cell of the above information in the handover preparation completion message. Instead, the target cell may wait until the UE successfully acquires the TA in advance and then notify the source cell of above-mentioned information. For example, in operation S608 of notifying the TA, or in operation S610 after the TAT notification operation, a notification message "UE information indication" from the target cell to the source cell is added to notify the source cell of above-mentioned information. The target cell may also distribute above-mentioned information in the "UE information indication" after TAT indication and the "handover preparation completion" for notification, and above-mentioned information may be arbitrarily combined to determine the information carried in the "handover preparation completion" message and the information carried in the "UE information indication" message.

At S604, after receiving the handover preparation completion from the target cell, the source cell sends a handover configuration message to the UE. The identifier of the target cell (Cell ID) will be definitely included in the handover configuration message, while not necessarily in other information. Even if the target cell notifies the above information of the UE in the handover preparation completion message, the source cell may provide all of the above information to the UE, or only provide a portion of the information to the UE. For example, in operation S604, the source cell only notifies the C-RNTI allocated to the UE by the target cell in the handover configuration message. When the source cell only provides a portion of the above information to the UE in the handover configuration message, other information may be provided to the UE using the L1/L2 triggered mobility indication used in operation S612.

At S605, after receiving the handover configuration, the UE replies with a "handover configuration response" message to the source cell, indicating that the UE has successfully received the handover configuration message.

Stage of Pre-Acquiring TA

UE acquires its TA at the target cell in advance using random access. UE may acquire TA using contention-based random access or non-contention based random access. The optional types of random access for UE may be seen in FIG. 5. As an example, at S606, the UE receives the PDCCH order from the source cell. This order instructs the UE to trigger a non-contention based random access procedure based on some resources in the random access resource pool, that is, based on the first dedicated PRACH resource. Some of the resources in the random access resource pool are specifically allocated to the current UE by the source cell, and the source cell will not allocate these resources to other UEs. Therefore, these resources are dedicated to the current UE, preventing contention among UEs.

Based on the PDCCH order from the source cell, at S607, the UE sends a preamble to the target cell on the above-mentioned resources.

After receiving the preamble, the target cell calculates the TA value of the UE and may notify the source cell or UE of the TA value. As an example, at S608, the target cell notifies the source cell of the TA value of the UE and initiates the TAT of the UE. Thus, the TA value of the UE is valid during the operational period of the TAT.

After receiving the TA value, the source cell activates the TAT of the UE, and the TA value of the UE is valid during the operational period of the TAT. After the UE completes the measurement and reports at S611, the source cell indicates the TA value and the remaining period of the TAT initiated by the source cell to the UE using L1/L2 triggered mobility instructions at S612.

After receiving the TA value and the remaining period of TAT, the UE may activate a timer based on the remaining period of TAT, and the TA value will be valid during the operational period of this timer.

Moreover, after triggering UE to initiate random access, the source cell may activate a timer. When a corresponding TA notification from the target cell is received, the timer is stopped; when timeout of the timer occurs but no corresponding TA notification from the target cell is received, the source cell considers the random access to have failed and may trigger the UE to initiate random access to the target cell again.

The source cell may also notify the UE of a power offset value using a PDCCH order when triggering UE to initiate random access. The UE may calculate an initial power for sending the preamble based on the path loss between the UE and the target cell, and add the power offset value notified in the PDCCH order to obtain the power for sending the preamble. When a random access is unsuccessful and the source cell triggers another random access, the power offset value will be increased.

The source cell may also notify the UE to maintain its number of random access attempts using a PDCCH order when triggering the UE to initiate random access. For example, the number 1 indicates that the UE needs to maintain the number of random access attempts for the present random access, and the number 0 indicates that the UE does not need to maintain the number of random access attempts for the present random access.

Stage of Indicating to Perform Handover

After successful random access, the source cell sends a lower-layer fast handover instruction to the UE, instructing the UE to perform handover to the target cell. The source cell may determine whether to trigger the lower-layer fast handover based on the measurement results of the UE. When it is determined to perform handover, an instruction is sent to the UE, as shown at S612. The indication may be MAC CE or DCI.

Stage of TAT Operating

After the TAT is activated and before timeout of the TAT or before timeout of the timer activated by the UE, it may be considered that the TA value acquired by the UE using random access is valid. Furthermore, when timeout of TA or of the timer activated by the UE does not occur, it may also be considered that the resources allocated to the UE by the target cell are valid, and the UE may transmit uplink data blocks to the target cell using these resources.

Specifically, when the CG resource is allocated during the stage of handover preparation, the UE considers CG to be valid before timeout of the TAT. When being instructed to monitor the PDCCH to acquire DG in the stage of handover preparation, the UE considers it necessary to monitor the PDCCH of the target cell to acquire DG before timeout of the TAT. When there is CG before timeout of the TAT, the UE uses CG to send uplink data blocks. When the UE detects the DG allocated to the UE by the target cell before timeout of the TAT, the UE uses the DG to send the uplink data block. When the target cell configures both CG and monitoring of PDCCH in the stage of handover preparation, the UE may use whichever resource arrives first before timeout of the TAT.

After the TAT is activated, when timeout of the TAT occurs or timeout of the timer activated by the UE occurs, and the UE has not successfully accessed the target cell, it is considered that the TA acquired by the UE and the resources allocated to the UE by the target device are invalid. At this point, the UE performs a handover failure related procedure and may initiate a contention-based random access to the target cell.

In the above processes of cell handover of the terminal device, TAT may be used to determine the validation duration of the TA acquired by the UE and of the resources allocated to the UE by the target cell. The timer activated by the source cell may be used to determine whether the non-contention random access triggered by the source cell is successful, thereby improving the reliability of communication.

The method embodiments of the present disclosure are illustrated in detail above in conjunction with FIGS. 1 to 6. In the following, the device embodiments of the present disclosure will be illustrated in detail in conjunction with FIGS. 7 to 10. It should be understood that the illustration of the method embodiments corresponds to the illustration of the device embodiments. Therefore, reference may be made to the method embodiments hereinbefore for the content not illustrated in detail.

Figure 7:
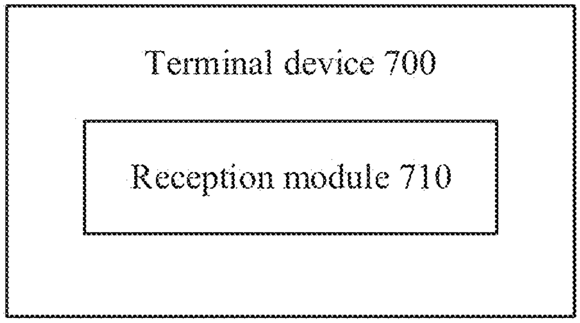
FIG. 7 is a schematic diagram of a structure of a terminal device provided in some embodiments of the present disclosure.

FIG. 7 is a schematic diagram of a structure of a terminal device provided in some embodiments of the present disclosure. The terminal device 700 in FIG. 7 includes a reception module 710 configured to receive a first TA during L1/L2 triggered mobility. The first TA refers to a TA of the terminal device relative to a target cell, and the first TA is valid during an operational period of a first TAT of the terminal device.

In some embodiments, the reception module 710 is further configured to receive first configuration information. The first configuration information is configured to indicate one or more of: a C-RNTI allocated to the terminal device by the target cell, a CG resource allocated to the terminal device by the target cell, a PDCCH surveillance space allocated to the terminal device by the target cell, a dedicated PRACH resource allocated to the terminal device by the target cell, and SR configuration.

In some embodiments, the CG resource or the PDCCH surveillance space is valid during the operational period of the first TAT.

In some embodiments, in response to the first configuration information indicating only the CG resource, the terminal device transmits a first piece of uplink data at the target cell using the CG resource; or in response to the first configuration information indicating only the PDCCH surveillance space, the terminal device transmits the first piece of uplink data at the target cell using a DG, where the DG is determined based on the PDCCH surveillance space; or in response to the first configuration information indicating the CG resource and the PDCCH surveillance space, the terminal device transmits the first piece of uplink data at the target cell using a first uplink resource, where the first uplink resource refers to an uplink resource selected from the CG resource and the DG by the terminal device, or the first uplink resource refers to an uplink resource of the CG resource and the DG that has an earlier transmission occasion.

In some embodiments, a portion of the first configuration information or the whole first configuration information is carried in a handover configuration message sent by a source cell.

In some embodiments, the first TA is determined based on a random access procedure initiated by the terminal device, and the random access procedure is a contention-based random access procedure or a non-contention based random access procedure.

In some embodiments, the random access procedure is a contention-based random access procedure triggered by the source cell, the target cell, or the terminal device.

In some embodiments, triggering by the source cell includes: triggering by the source cell based on a handover configuration message, MAC CE, or a PDCCH command; or triggering by the target cell includes: triggering by the target cell based on MAC CE or the PDCCH command.

In some embodiments, the random access procedure is a non-contention based random access procedure triggered by the source cell or the target cell.

In some embodiments, the non-contention based random access procedure is triggered by the source cell and is initiated based on a first dedicated PRACH resource, where the first dedicated PRACH resource is selected, by the source cell, from a first PRACH resource group provided by the target cell.

In some embodiments, the non-contention based random access procedure is triggered by the source cell and is initiated based on a second dedicated PRACH resource, where the second dedicated PRACH resource is allocated to the terminal device by the target cell.

In some embodiments, triggering by the source cell includes: triggering by the source cell using a PDCCH command, or triggering by the source cell using a handover configuration message.

In some embodiments, the operational period of the first TAT is determined based on a remaining period of the first TAT indicated by the source cell.

In some embodiments, the reception module 710 is further configured to receive a first message sent by the source cell. The first message is configured to trigger the terminal device to initiate a random access procedure, and the first message includes one or more of: an offset value of a transmission power for a random access message, and information for indicating whether maintenance of a number of random access attempts by the terminal device is required.

Figure 8:
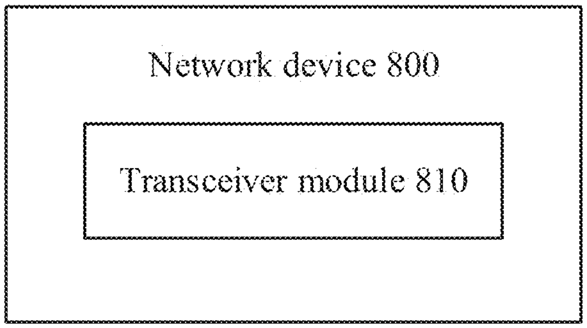
FIG. 8 is a schematic diagram of a structure of a network device provided in some embodiments of the present disclosure.

FIG. 8 is a schematic diagram of a structure of a network device provided in some embodiments of the present disclosure. The network device 800 shown in FIG. 8 corresponds to a source cell and includes a transceiver module 810 configured to send a first TA during L1/L2 triggered mobility, where the first TA refers to a TA of a terminal device relative to the target cell, and the first TA is valid during an operational period of a first TAT of the terminal device.

In some embodiments, the first TAT is activated after the source cell receives the first TA, or the first TAT is activated after the source cell receives the first TA and sends the first TAT to the target cell.

In some embodiments, the network device further includes an activating module configured to activate a first timer after the activating module sends a first message, where the first message is configured to trigger the terminal device to initiate a random access procedure. In response to the first TA being received during an operational period of the first timer, the source cell determines that the random access procedure succeeds; and/or in response to the first TA being not received during the operational period of the first timer, determining, the source cell determines that the random access procedure fails.

In some embodiments, the transceiver module 810 is further configured for the source cell to receive first configuration information from the target cell, or for the source cell to send the first configuration information to the terminal device. The first configuration information is configured to indicate one or more of: a C-RNTI allocated to the terminal device by the target cell, a CG resource allocated to the terminal device by the target cell, a PDCCH surveillance space allocated to the terminal device by the target cell, a dedicated PRACH resource allocated to the terminal device by the target cell, and SR configuration.

In some embodiments, the CG resource or the PDCCH surveillance space is valid during the operational period of the first TAT.

In some embodiments, in response to the first configuration information indicating only the CG resource, the terminal device transmits a first piece of uplink data at the target cell using the CG resource; or in response to the first configuration information indicating only the PDCCH surveillance space, the terminal device transmits the first piece of uplink data at the target cell using a DG, where the DG is determined based on the PDCCH surveillance space; or in response to the first configuration information indicating the CG resource and the PDCCH surveillance space, the terminal device transmits the first piece of uplink data at the target cell using a first uplink resource, where the first uplink resource refers to an uplink resource selected from the CG resource and the DG by the terminal device, or the first uplink resource refers to an uplink resource of the CG resource and the DG that has an earlier transmission occasion.

In some embodiments, the first TA is determined based on a random access procedure initiated by the terminal device, and the random access procedure is a contention-based random access procedure or a non-contention based random access procedure.

In some embodiments, the random access procedure is a contention-based random access procedure triggered by the source cell, the target cell, or the terminal device.

In some embodiments, triggering by the source cell includes: triggering by the source cell based on a handover configuration message, MAC CE, or a PDCCH command; or triggering by the target cell includes: triggering by the target cell based on MAC CE or the PDCCH command.

In some embodiments, the random access procedure is a non-contention based random access procedure triggered by the source cell or the target cell.

In some embodiments, the non-contention based random access procedure is triggered by the source cell and is initiated based on a first dedicated PRACH resource, and wherein the first dedicated PRACH resource is selected, by the source cell, from a first PRACH resource group provided by the target cell.

In some embodiments, the non-contention based random access procedure is triggered by the source cell and is initiated based on a second dedicated PRACH resource, and wherein the second dedicated PRACH resource is allocated to the terminal device by the target cell.

In some embodiments, triggering by the source cell includes: triggering by the source cell using a PDCCH command, or triggering by the source cell using a handover configuration message.

In some embodiments, the operational period of the first TAT is determined based on a remaining period of the first TAT indicated by the source cell.

In some embodiments, the transceiver module 810 is further configured to send a first message to the terminal device. The first message is configured to trigger the terminal device to initiate a random access procedure, and the first message includes one or more of: an offset value of a transmission power for a random access message, and information for indicating whether maintenance of a number of random access attempts by the terminal device is required.

Figure 9:
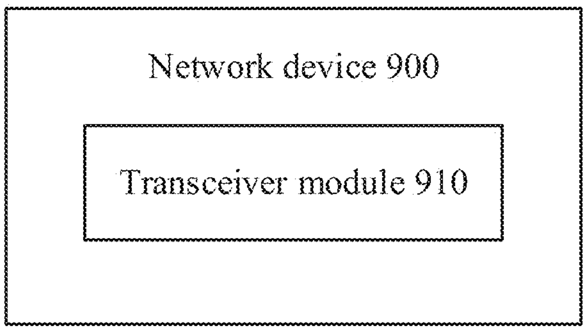
FIG. 9 is a schematic diagram of a structure of another network device provided in some embodiments of the present disclosure.

FIG. 9 is a schematic diagram of a structure of another network device provided in some embodiments of the present disclosure. The network device 900 shown in FIG. 9 corresponds to a target cell and includes a transceiver module 910 configured to send a first TA during L1/L2 triggered mobility, where the first TA refers to a TA of a terminal device relative to the target cell, and the first TA is valid during an operational period of a first TAT of the terminal device.

In some embodiments, the first TAT is activated after the target cell sends the first TA, or the first TAT is activated after the target cell sends the first TA to a source cell and receives the first TAT sent by the source cell.

In some embodiments, the transceiver module 910 is further configured to send first configuration information to the source cell. The first configuration information is configured to indicate one or more of: a C-RNTI allocated to the terminal device by the target cell, a CG resource allocated to the terminal device by the target cell, a PDCCH surveillance space allocated to the terminal device by the target cell, a dedicated PRACH resource allocated to the terminal device by the target cell, and SR configuration.

In some embodiments, the CG resource or the PDCCH surveillance space is valid during the operational period of the first TAT.

In some embodiments, in response to the first configuration information indicating only the CG resource, the terminal device transmits a first piece of uplink data at the target cell using the CG resource; or in response to the first configuration information indicating only the PDCCH surveillance space, the terminal device transmits the first piece of uplink data at the target cell using a DG, where the DG is determined based on the PDCCH surveillance space; or in response to the first configuration information indicating the CG resource and the PDCCH surveillance space, the terminal device transmits the first piece of uplink data at the target cell using a first uplink resource, where the first uplink resource refers to an uplink resource selected from the CG resource and the DG by the terminal device, or the first uplink resource refers to an uplink resource of the CG resource and the DG that has an earlier transmission occasion.

In some embodiments, the first TA is determined based on a random access procedure initiated by the terminal device, and the random access procedure is a contention-based random access procedure or a non-contention based random access procedure.

In some embodiments, the random access procedure is a contention-based random access procedure triggered by the source cell, the target cell, or the terminal device.

In some embodiments, triggering by the source cell includes: triggering by the source cell based on a handover configuration message, MAC CE, or a PDCCH command; or triggering by the target cell includes: triggering by the target cell based on MAC CE or the PDCCH command.

In some embodiments, the random access procedure is a non-contention based random access procedure triggered by the source cell or the target cell.

In some embodiments, the non-contention based random access procedure is triggered by the source cell and is initiated based on a first dedicated PRACH resource, where the first dedicated PRACH resource is selected, by the source cell, from a first PRACH resource group provided by the target cell.

In some embodiments, the non-contention based random access procedure is triggered by the source cell and is initiated based on a second dedicated PRACH resource, where the second dedicated PRACH resource is allocated to the terminal device by the target cell.

In some embodiments, triggering by the source cell includes: triggering by the source cell using a PDCCH command, or triggering by the source cell using a handover configuration message.

In some embodiments, the operational period of the first TAT is determined based on a remaining period of the first TAT indicated by a source cell.

Figure 10:
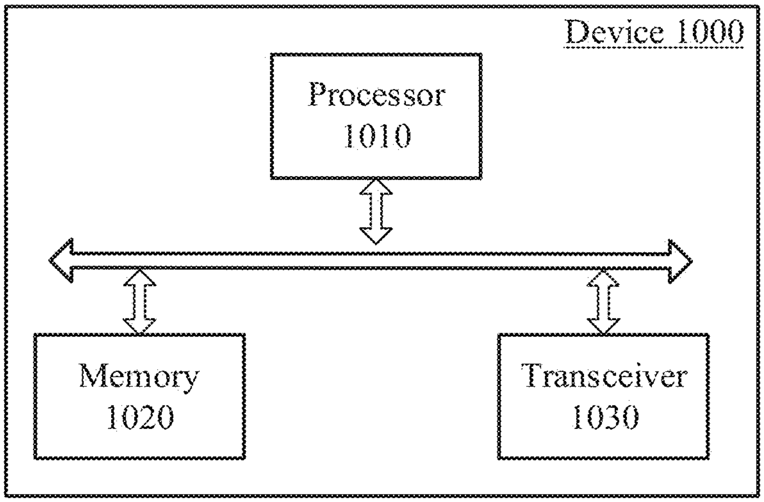
FIG. 10 is a schematic diagram of a structure of a device provided in some embodiments of the present disclosure.

FIG. 10 is a schematic diagram of the structure of the communication device provided in some embodiments of the present disclosure. The communication device 1000 may be used to implement the method illustrated in the above method embodiments. The device 1000 may be a chip, a terminal device, or a base station.

The communication device 1000 may include one or more processors 1010. The one or more processors 1010 can support the device 1000 to implement the method illustrated in the above method embodiments. Each of the one or more processors 1010 may be a general-purpose processor or a special-purpose processor. For example, each of the one or more processors may be a central processing unit (CPU). Alternatively, each of the one or more processors may also be other general-purpose processor, a digital signal processor (DSP), an application specific integrated circuit (ASIC), a field programmable gate array (FPGA), or other programmable logic device, a discrete gate or a transistor logic device, a discrete hardware component, or the like. A general-purpose processor may be a microprocessor or any conventional processor.

The communication device 1000 may further include one or more memories 1020. Each of the one or more memories 1020 stores a program that can be executed by the one or more processors 1010 so that the one or more processors 1010 perform operations of the method illustrated in the above method embodiments. The one or more memories 1020 may be independent of or integrated into the one or more processors 1010.

The communication device 1000 may further include a transceiver 1030. The one or more processors 1010 may communicate with other devices or chips through the transceiver 1030. For example, the one or more processors 1010 may transmit data to and receive data from other devices or chips through the transceiver 1030.

It should be understood that in the embodiments of the present disclosure, the one or more processors 1010 may be CPUs, microprocessors, ASICs, or one or more integrated circuits for executing relevant programs to implement the technical solutions provided in the embodiments of the present disclosure.

The one or more memories 1020 may include read-only memories and random access memories, and are configured to provide instructions and data to the one or more processors 1010. A portion of the one or more processors 1010 may further include non-transitory random access memory. For example, the one or more processors 1010 may also store information about device types.

In the implementation process, operations of the above methods may be implemented using hardware such as integrated logic circuits in the one or more processors 1010 or software instructions. The method for requesting uplink transmission resources disclosed in the embodiments of the present disclosure may be directly implemented by hardware such as a processor, or by a combination of hardware in a processor and software modules. The software modules may be located in mature storage media in the art, such as random access memory, flash memory, read-only memory, programmable read-only memory or electrically erasable programmable memory, registers, and the like. The storage medium is located in the one or more memories 1020, and the one or more processors 1010 read the information in the one or more memories 1020 and implement the operations of the above methods using its hardware, which will not be illustrated in detail here to avoid repetition.

It should be understood that in the embodiments of the present disclosure, each of the one or more processors 1010 may be a CPU. Alternatively, each of the one or more processors may be other general-purpose processor, a DSP, an ASIC, a FPGA, or other programmable logic device, a discrete gate or a transistor logic device, a discrete hardware component, or the like. A general-purpose processor may be a microprocessor or any conventional processor.

The embodiments of the present disclosure further provide a computer-readable storage medium configured to store programs. The computer-readable storage medium is applicable to the terminal device or the base station provided in the embodiments of the present disclosure, and the program causes a computer to perform operations of the method for cell handover in the embodiments of the present disclosure.

The embodiments of the present disclosure further provide a computer program product including programs. The computer program product is applicable to the terminal device or the base station provided in the embodiments of the present disclosure, and the programs cause a computer to perform operations of the method for cell handover in the embodiments of the present disclosure.

The embodiments of the present disclosure further provide a computer program. The computer program is applicable to the terminal device or the base station provided in the embodiments of the present disclosure, and the computer program causes a computer to perform operations of the method for cell handover in the embodiments of the present disclosure.

It should be understood that in the embodiments of the present disclosure, "B corresponding to A" represents that B is associated with A, and B may be determined based on A. However, it should also be understood that, determining B based on A does not only represent determining B based only on A, but instead B may be determined based on A and/or other information.

In the embodiments of the present disclosure, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present disclosure, sequence numbers of the foregoing processes do not represent execution sequences. The execution sequences of the processes should be determined according to functions and internal logics of the processes, and should not be construed as any limitation on the implementation processes of the embodiments of the present disclosure.

In the embodiments provided in the present disclosure, it should be understood that, the disclosed system, apparatus, and method may be implemented in other manners. For example, the described device embodiments are merely exemplary. For example, the division of units is merely logical function division and there may be other division manners in practice. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, function units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of computer program products. A computer program product includes one or more computer instructions. When the computer program instructions are loaded and executed on a computer, the procedures or functions according to the embodiments of the present disclosure are completely or partially generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center formed by integrating one or more usable medium. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for cell handover, comprising:

receiving, by a terminal device, a first time advance (TA) during layer 1 (L1)/layer 2 (L2) triggered mobility, wherein the first TA is a TA of the terminal device relative to a target cell, and the first TA is valid during an operational period of a first time alignment timer (TAT) of the terminal device, wherein the first TA is determined based on a random access procedure initiated by the terminal device, and the random access procedure is a non-contention based random access procedure triggered by a source cell and is initiated based on a first dedicated physical random access channel (PRACH) resource, and wherein the first dedicated PRACH resource is selected from a first PRACH resource group provided by the target cell; and transmitting a signal by using the first TA.

2. The method according to claim 1, further comprising:

receiving, by the terminal device, first configuration information, wherein the first configuration information indicates one or more of:

a cell-radio network temporary identifier (C-RNTI) allocated to the terminal device by the target cell;

a configured grant (CG) resource allocated to the terminal device by the target cell;

a physical downlink control channel (PDCCH) surveillance space allocated to the terminal device by the target cell;

a dedicated physical random access channel (PRACH) resource allocated to the terminal device by the target cell; or scheduling request (SR) configuration.

3. The method according to claim 2, wherein the CG resource or the PDCCH surveillance space is valid during the operational period of the first TAT.

4. The method according to claim 2, wherein at least a portion of the first configuration information is carried in a handover configuration message from a source cell.

5. The method according to claim 1, wherein the operational period of the first TAT is determined based on a remaining period of the first TAT.

6. The method according to claim 5, wherein the remaining period is received from a source cell.

7. The method according to claim 1, further comprising:

receiving, by the terminal device, a first message from a source cell, wherein the first message is configured to trigger the terminal device to initiate a random access procedure, and the first message comprises one or more of:

an offset value of a transmission power for a random access message; or information for indicating whether maintenance of a number of random access attempts by the terminal device is required.

8. A method for cell handover, comprising:

receiving, by a source cell, a first TA during L1/L2 triggered mobility, wherein the first TA is a TA of a terminal device relative to a target cell, and the first TA is valid during an operational period of a first TAT of the terminal device, wherein the first TA is determined based on a random access procedure initiated by the terminal device, and the random access procedure is a non-contention based random access procedure triggered by the source cell and is initiated based on a first dedicated physical random access channel (PRACH) resource, and wherein the first dedicated PRACH resource is selected from a first PRACH resource group provided by the target cell.

9. The method according to claim 8, further comprising:

sending first configuration information, wherein the first configuration information indicates one or more of:

a cell-radio network temporary identifier (C-RNTI) allocated to the terminal device by the target cell;

a configured grant (CG) resource allocated to the terminal device by the target cell;

a physical downlink control channel (PDCCH) surveillance space allocated to the terminal device by the target cell;

a dedicated physical random access channel (PRACH) resource allocated to the terminal device by the target cell; or scheduling request (SR) configuration.

10. The method according to claim 9, wherein the CG resource or the PDCCH surveillance space is valid during the operational period of the first TAT.

11. The method according to claim 9, wherein at least a portion of the first configuration information is carried in a handover configuration message from the source cell.

12. The method according to claim 9, wherein the operational period of the first TAT is determined based on a remaining period of the first TAT.

13. The method according to claim 9, further comprising:

sending a first message, wherein the first message is configured to trigger the terminal device to initiate a random access procedure, and the first message comprises one or more of:

an offset value of a transmission power for a random access message; or information for indicating whether maintenance of a number of random access attempts by the terminal device is required.

14. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving, by a terminal device, a first time advance (TA) during layer 1 (L1)/layer 2 (L2) triggered mobility, wherein the first TA is a TA of the terminal device relative to a target cell, and the first TA is valid during an operational period of a first time alignment timer (TAT) of the terminal device, wherein the first TA is determined based on a random access procedure initiated by the terminal device, and the random access procedure is a non-contention based random access procedure triggered by a source cell and is initiated based on a first dedicated physical random access channel (PRACH) resource, and wherein the first dedicated PRACH resource is selected from a first PRACH resource group provided by the target cell; and transmitting a signal by using the first TA.

15. The apparatus according to claim 14, the operations further comprising:

receiving, by the terminal device, first configuration information, wherein the first configuration information indicates one or more of:

a cell-radio network temporary identifier (C-RNTI) allocated to the terminal device by the target cell;

a configured grant (CG) resource allocated to the terminal device by the target cell;

a physical downlink control channel (PDCCH) surveillance space allocated to the terminal device by the target cell;

a dedicated physical random access channel (PRACH) resource allocated to the terminal device by the target cell; or scheduling request (SR) configuration.

16. The apparatus according to claim 15, wherein the CG resource or the PDCCH surveillance space is valid during the operational period of the first TAT.

17. The apparatus according to claim 15, wherein at least a portion of the first configuration information is carried in a handover configuration message from a source cell.

18. The apparatus according to claim 14, wherein the operational period of the first TAT is determined based on a remaining period of the first TAT.

19. The apparatus according to claim 18, wherein the remaining period is received from a source cell.

20. The apparatus according to claim 14, wherein the operations comprise:

receiving a first message from a source cell, wherein the first message is configured to trigger the terminal device to initiate a random access procedure, and the first message comprises one or more of:

an offset value of a transmission power for a random access message; or information for indicating whether maintenance of a number of random access attempts by the terminal device is required.

* * * * *